(12) United States Patent
Hui et al.

(10) Patent No.: US 8,521,938 B2
(45) Date of Patent: Aug. 27, 2013

(54) UNIVERSAL SERIAL BUS HOST CONTROLLER AND CONTROL METHOD THEREOF

(75) Inventors: Zhiqiang Hui, Taipei (TW); Jiin Lai, Taipei (TW); Shanna Pang, Taipei (TW); Di Dai, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 378 days.

(21) Appl. No.: 12/900,309

(22) Filed: Oct. 7, 2010

(65) Prior Publication Data

US 2011/0093640 A1 Apr. 21, 2011

(30) Foreign Application Priority Data

Oct. 21, 2009 (CN) .......................... 2009 1 0205377

(51) Int. Cl.
*G06F 13/36* (2006.01)
(52) U.S. Cl.
USPC ........................................................ 710/310
(58) Field of Classification Search
USPC ........................................................ 710/310
See application file for complete search history.

(56) References Cited

U.S. PATENT DOCUMENTS

| | | | |
|---|---|---|---|
| 6,816,929 B2* | 11/2004 | Ueda | 710/56 |
| 7,757,028 B2* | 7/2010 | Druke et al. | 710/244 |
| 2009/0287871 A1 | 11/2009 | Zhang et al. | |
| 2011/0022769 A1* | 1/2011 | Hung et al. | 710/313 |
| 2011/0099305 A1* | 4/2011 | Dai et al. | 710/52 |
| 2011/0314196 A1* | 12/2011 | Ortiz et al. | 710/106 |
| 2012/0084469 A1* | 4/2012 | Tang et al. | 710/53 |

FOREIGN PATENT DOCUMENTS

CN 101266584 9/2008

* cited by examiner

*Primary Examiner* — Nimesh G Patel
(74) *Attorney, Agent, or Firm* — McClure, Qualey & Rodack, LLP (57) ABSTRACT

A USB host controller is provided. The USB host controller is capable of communicating with multiple USB apparatuses having endpoints and sends a request to a first endpoint. The USB host controller includes a first storage and a first control unit. The first control unit stores endpoint information from the first endpoint into the first storage when the first endpoint issues an unready transaction packet in response to the request. The unready transaction packet indicates that the first endpoint is not ready.

14 Claims, 5 Drawing Sheets

| 25 | 24 | 23   20 | 19   13 | 12   5 | 4   0 |
|----|----|---------|---------|--------|-------|
| V  | D  | Endpoint number | Device address | SlotID | DCI |

UNIVERSAL SERIAL BUS HOST CONTROLLER AND CONTROL METHOD THEREOF

CROSS REFERENCE TO RELATED APPLICATIONS

This Application claims priority of China Patent Application No. 200910205377.X, filed on Oct. 21, 2009, the entirety of which is incorporated by reference herein.

BACKGROUND OF THE INVENTION

1. Field of the Invention

The invention relates to an NRDY/ERDY mechanism for a universal serial bus (USB) 3.0 protocol, and more particularly to a USB host controller and a control method thereof based on a USB 3.0 protocol which can reduce the time for processing NRDY response and EDRY requests, thereby enhancing the performance of the USB host controller.

2. Description of the Related Art

Figure 1:
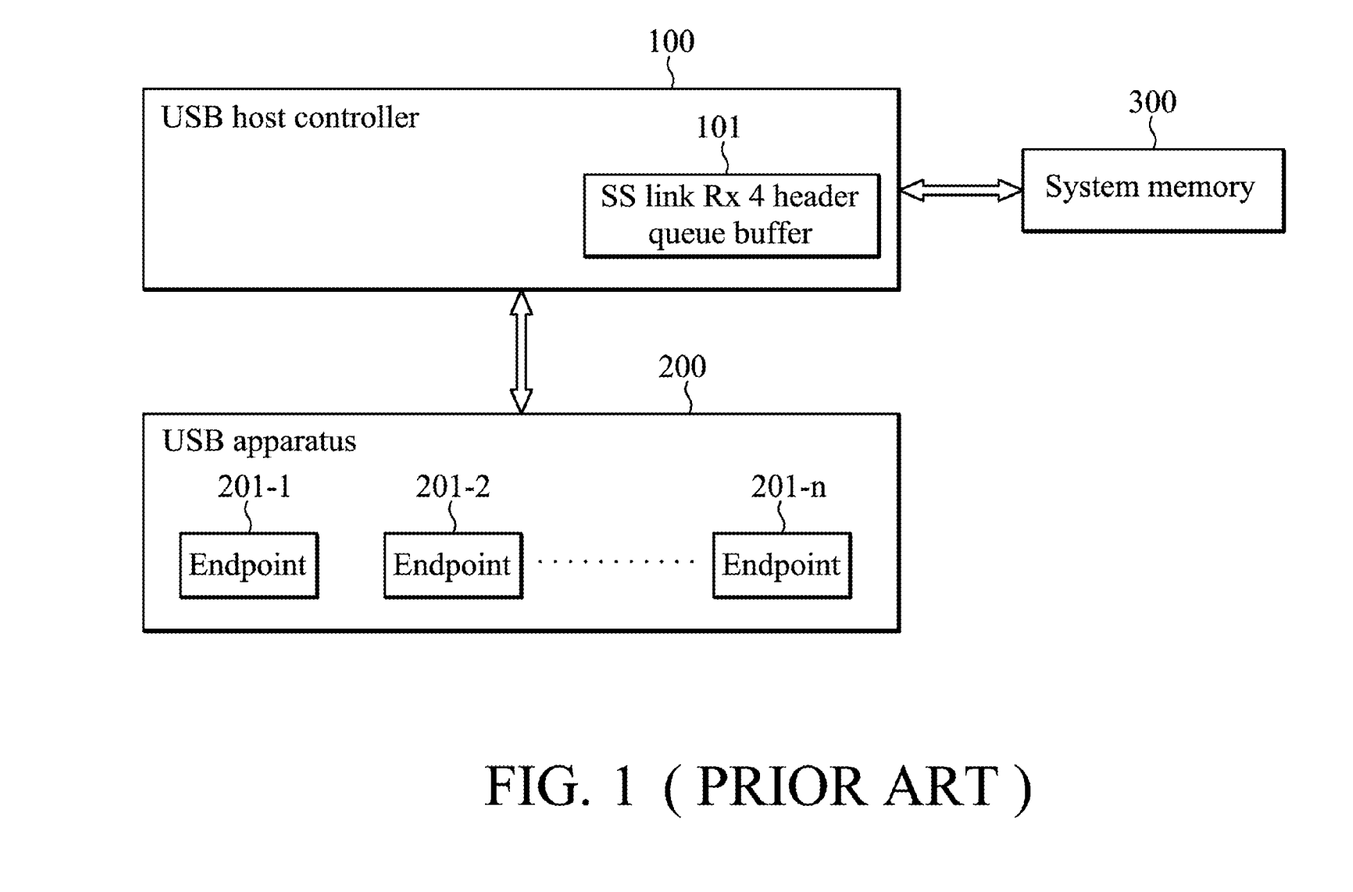
FIG. 1 shows a conventional USB host controller using a NRDY/ERDY mechanism.

Currently, there is a universal serial bus (USB) 3.0 protocol. In the USB 3.0 protocol, an NRDY (unready, or not ready)/ERDY (endpoint ready) mechanism is defined. FIG. 1 shows a conventional USB host controller using a NRDY/ERDY mechanism. As shown in FIG. 1, a USB host controller 100 is coupled to an external system memory 300 and communicates with at least one USB apparatus through a USB bus (USB apparatus 200). The USB apparatus 200 includes one or more endpoints 201-1, 201-2 . . . 201-n.

When the USB host controller 100 sends a request (for example, an input (IN) request or an output (OUT) request) to the one or more endpoints (for example, the endpoint 201-1), if the endpoint 201-1 is not ready to send/receive the requested IN/OUT data, the endpoint 201-1 sends an NRDY response (that is, an NRDY transaction packet) to indicate that the endpoint, temporarily, has not sent/received and can not send/receive the requested IN/OUT data. When the endpoint 201-1 is ready to send/receive the requested IN/OUT data, the endpoint 201-1 sends an ERDY request (that is, an ERDY transaction packet) to the USB host controller 100, so that the USB host controller 100 re-performs the corresponding transaction which was not performed previously.

However, one of drawbacks for the above described USB host controller is:

In the USB host controller, there is a buffer with a fixed size for temporarily storing various transaction packets from the USB apparatus. For example, in FIG. 1, an SS link Rx 4 header queue buffer 101 is disposed in the USB host controller 100 and is configured to temporarily store transaction packets from all of the USB apparatuses which communicate with the USB host controller. The buffer 101 is configured to contain four transaction packets at most. However, according to the above description, when the conventional USB host controller processes one ERDY transaction packet, a long response time is required due to a complicated process. Thus, if a multitude of USB apparatuses send ERDY transaction packets to the USB host controller at the same time, the buffer 101 may be in a full state, so that the USB host controller would be impeded when re-arranging transaction of respective endpoints according to received ERDY transaction packets.

Thus, it is desired to provide a USB host controller and a control method which can reduce the time required for dealing with EDRY transaction packets, thereby enhancing the performance of the USB host controller.

BRIEF SUMMARY OF THE INVENTION

The invention provides a USB host controller and a control method for the USB host controller. When the USB host controller receives an NRDY response, required storage time for the NRDY information is reduced. Moreover, when the USB host controller receives an ERDY transaction packet, the time of searching for matched NRDY information is reduced, thereby avoiding the SS link Rx 4 header queue buffer in a full state and enhancing the performance of the USB host controller.

In one aspect of the invention, an exemplary embodiment of a USB host controller is provided. The USB host controller is capable of communicating with multiple USB apparatuses having endpoints and sends a request to a first endpoint. The USB host controller includes a first storage and a first control unit. The first control unit stores endpoint information from the first endpoint into the first storage when the first endpoint issues an unready transaction packet in response to the request, wherein the unready transaction packet indicates that the first endpoint is not ready.

In another aspect of the invention, an exemplary embodiment of a USB host controller is provided. The USB host controller is capable of communicating with multiple USB apparatuses having endpoints and sends a request to a first endpoint. The USB host controller includes a first storage and a first control unit. The first control unit stores endpoint information from the first endpoint into the first storage when the first endpoint issues an unready transaction packet in response to the request. When the USB host controller receives a ready transaction packet from a second endpoint, the first control unit checks whether there is endpoint information in the first storage that matches the ready transaction packet. If there is a match, the first control unit sends a request to the second endpoint. The unready transaction packet indicates that the first endpoint is not ready.

In further another aspect of the invention, an exemplary embodiment of a control method for a USB host controller is provided. The USB host controller includes a first storage and is capable of communicating with multiple USB apparatuses having endpoints. The control method includes sending a request to a first endpoint and storing endpoint information from the first endpoint into the first storage when the first endpoint issues an unready transaction packet in response to the request. The unready transaction packet indicates that the first endpoint is not ready.

According to the above exemplary embodiments, the first storage is disposed on the inside of the USB host controller. The USB host controller stores endpoint information on NRDY response into the first storage instead of storing it into an external system memory, thereby reducing required storage time for the endpoint information. Afterward, when receiving an ERDY request, the USB host controller first accesses the first storage in the USB host controller to look for the matched information. If there is a match, the required time to respond to the ERDY request is reduced, the complex process of accessing the external system memory can be prevented, the possibility that the SS link Rx 4 header queue buffer in a full state is lowered, and the performance of the USB host controller is enhanced.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
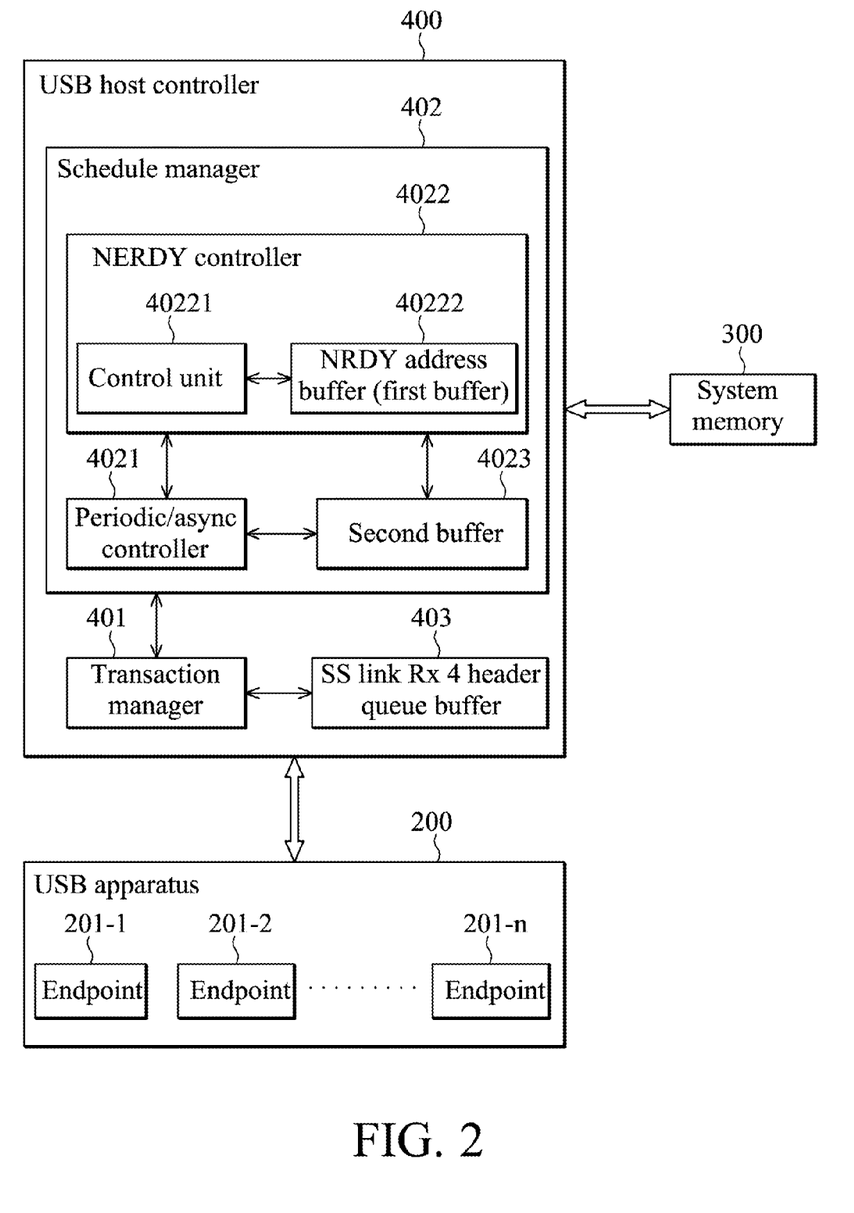
FIG. 2 shows an exemplary embodiment of a USB host controller.

FIG. 2 shows an exemplary embodiment of a USB host controller. Note that the USB host controller shown in FIG. 2 is one part of a USB host controller based on the USB 3.0 protocol and the xHCI protocol, which is related to the conception of the invention.

As shown in FIG. 2, a USB host controller 400 is coupled to an external system memory 300 and communicates with a USB apparatus 200 through a USB. The USB apparatus 200 includes one or more endpoints 201-1, 201-2 . . . 201-3. Note that one or more USB apparatuses may communicate with the USB host controller 400, and, however, FIG. 2 shows only one USB apparatus 200 for clarity.

The USB host controller 400 includes a transaction manager 401, a schedule manager 402, and an SS link Rx 4 header queue buffer 403. The schedule manager 402 includes a periodic/asynchronous (abbreviated to async) controller 4021, an NERDY controller 4022, and a second buffer 4023. In the embodiment, the second buffer 4023 is a scratchpad buffer.

The transaction manager 401 is configured to manage transaction related to the USB apparatus 200, for example, the transaction manager 401 sends a request to one endpoint (for example, the endpoint 201-1) of the USB apparatus 200 and receives responses/requests from the endpoint. The sent requests can be an input request or an output request. The received responses/requests from the endpoint may be NRDY responses or ERDY requests. Moreover, when the schedule manager 402 detects that an NRDY address table is completely allocated (that is, all entries in the NRDY address table are not empty), the transaction manager 401 responds to the commands from the schedule manager 402 and stops sending transactions, to the endpoints of all of the USB apparatuses communicating with the USB host controller 400.

As described above, when the endpoint 201-1 receives an IN/OUT data request from the USB host controller 400, if the endpoint 201-1 is busy or is not ready to send/receive the requested IN/OUT data due to certain reasons, the endpoint 201-1 sends an NRDY transaction packet to serve as a response to the request. The NRDY transaction packet includes NRDY information of the endpoint 201-1. The NRDY information includes a slot identification (SlotID) for identifying the USB apparatus 200 which the endpoint 201-1 belongs to, a device context index (DCI) for identifying the endpoint 201-1 in the USB apparatus 200, a device address of the USB apparatus 200, a endpoint number of the endpoint 201-1, and direction for indicating that the request inducing the NRDY transaction packet is an input request (reading request) or an output request (writing request).

The periodic/async controller 4021 sends a request, which indicates that the NRDY information of the NRDY transaction packet is to be stored into the NRDY address table, to the NERDY controller 4022. The NRDY address table will be described later. Moreover, when the USB host controller 400 receives the NRDY transaction packet from the endpoint 201-1, the USB host controller 400 interrupts the data transaction between the USB host controller 400 and the endpoint 201-1. After the USB host controller 400 receives an ERDY transaction packet from the endpoint 201-1, the USB host controller sends a request and continuously performs data transaction to the endpoint 201-1. Thus, after receiving the NRDY transaction packet from the endpoint 201-1, the periodic/async controller 4021 indicates that the NRDY response position of the endpoint 201-1 is to be stored or updated into the second buffer 4023. In the embodiment, the NRDY response position includes information of DCI and SlotID for a derived endpoint. Thus, when the USB host controller 400 receives an ERDY transaction packet from the endpoint 201-1, a corresponding entry (NRDY information) of the NRDY address table may be found by matching Direction, Endpoint Number, and Device Address. Then, according to the corresponding NRDY response position obtained from the SlotID and DCI of the corresponding entry, a request is sent to the derived endpoint. Note that the periodic/async controller 4021 in FIG. 2 is a single element. In other embodiments, however, the periodic/async controller 4021 can be divided into a periodic controller and an async controller, and the periodic controller or the async controller can perform the above functions.

The NERDY controller 4022 includes a control unit 40221 and an NRDY address buffer 40222 (first buffer 40222).

Figure 3:
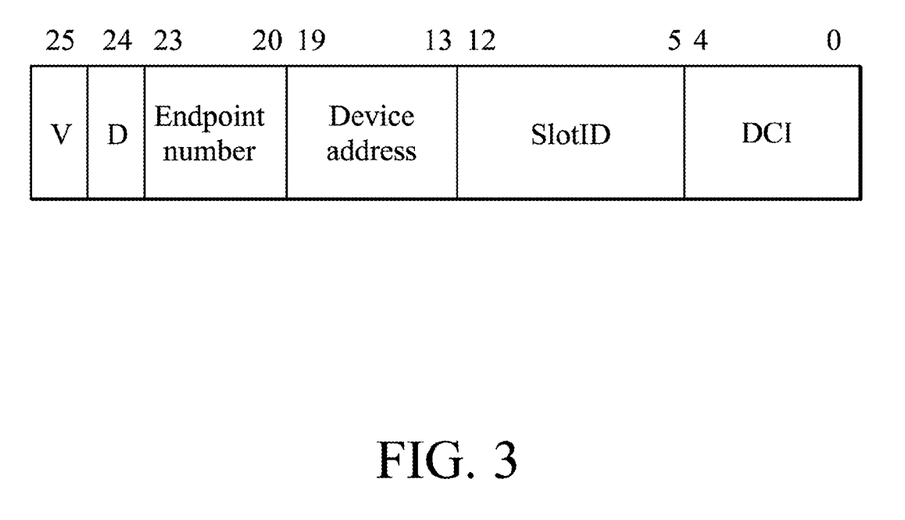
FIG. 3 shows one entry in the NRDY address table in the USB host controller of FIG. 2.

The NRDY address buffer 40222 is configured to store NRDY information; that is the endpoint information of the endpoint 201-1. Specifically, an NRDY address table can be stored in the NRDY address buffer 40222, and there is a plurality of entries in the NRDY address table to store the NRDY information. In the embodiment, the NRDY address table includes 32 entries, and each entry has 26 bits for storing the NRDY information retrieved from one NRDY transaction packet. A format of one entry in the NRDY address table is shown in FIG. 3. The lengths and significance of fields in the format are shown in Table 1.

TABLE 1

| Bits | Fields | Description |
| --- | --- | --- |
| 4:0 | DCI | For identifying the endpoint in the USB apparatus. The DCI field and the SlotID field are used to address the data structure of the endpoint in the second buffer 4023 (such as the NRDY response position). |
| 12:5 | SlotID | For identifying the USB apparatus. The SlotID field and the DCI field are used to address the data structure of the endpoint in the second buffer 4023 (such as the NRDY response position). |
| 19:13 | Device address | The device address of the USB apparatus |
| 23:20 | Endpoint number | The number of the endpoints in the USB apparatus |
| 24 | D | A direction bit indicates that the request inducing the NRDY transaction packet is an input request or an output request. |
| 25 | V | A valid bit. If the V field is set to "1", the NRDY information in the corresponding entry is valid; if |

TABLE 1-continued

| Bits | Fields | Description |
|---|---|---|
| | | the V field is set to "0", the corresponding entry is empty. |

When the NERDY controller 4022 receives a request to store NRDY information sent by the periodic/async controller 4021, the control unit 40221 stores the NRDY information of the endpoint 201-1 into an empty entry of the NRDY address table, and sets the bit "V" to "1". Then, the control unit 40221 checks whether the NRDY address table is completely allocated; that is, the control unit 40221 checks whether there is no empty entry in the NRDY address table. If the NRDY address table is completely allocated, the control unit 40221 sends a command to the transaction manager 401 to indicate that the transaction has stopped from being sent to all of the USB apparatuses communicating with the USB host controller 400. After the transaction manager 401 receives the command, and stops sending transactions. On the contrary, if the NRDY address table is not completely allocated, the control unit 40221 can continuously process other transactions.

Each when receiving an NRDY transaction packet from the endpoint in the USB apparatus, the USB host controller performs the above process and stores the corresponding NRDY information into an entry of the NRDY address table in the NRDY address buffer 40222, and a NRDY response position is stored or updated in the second buffer 4023.

As described above, after one endpoint sends an NRDY transaction packet, if the endpoint is ready and is capable of sending/receiving the request IN/OUT data, the endpoint sends an ERDY request (an ERDY transaction packet) to the USB host controller 400. The ERDY transaction packet includes a device address of the USB apparatus which the endpoint belongs to, an endpoint number of the endpoint, direction for indicating that the request inducing the ERDY transaction packet is an input request or an output request, and other information.

The transaction manager 401 receives the ERDY transaction packet and sends it to the schedule manager 402. Then, the control unit 40221 accesses the NRDY address buffer 40222. The control unit 40221 further compares the device address, the endpoint number, and the direction with the valid NRDY information of the corresponding fields in the NRDY address table, respectively, to confirm whether the NRDY address table has stored the NRDY information matching the ERDY transaction packet.

If there is matched NRDY information in the NRDY address table, the control unit 40221 reads the NRDY information and releases the corresponding entry which is storing the NRDY information. Then, the control unit 40221 fetches NRDY response position of an endpoint which is stored previously from the second buffer 4023 according to the fields "SlotID" and "DCI" in the matched entry. Thus, the transaction manager 401 sends requests to the derived endpoint for subsequent data transactions.

The SS link Rx 4 header queue buffer 403 is similar to the SS link Rx 4 header queue buffer 101 in FIG. 1. The SS link Rx 4 header queue buffer 403 is configured to temporarily store the requests from all the USB apparatus communicating with the USB host controller. In the embodiment, the SS link Rx 4 header queue buffer 403 is configured to contain four ERDY requests at most.

As shown in FIG. 2, an NRDY address buffer 40222 is disposed on the inside of the USB host controller. The USB host controller stores the NRDY information on the NRDY transaction packets from the endpoints into the NRDY address buffer instead of storing it into an external system memory, thereby reducing required storage time for the NRDY information. Afterward, when receiving an ERDY request, the USB host controller first accesses the NRDY address buffer in the USB host controller to look for the matched information. If there is a match, the required time to respond to the ERDY request is reduced, and the possibility that the SS link Rx 4 header queue buffer in a full state is lowered.

In the above description, the NRDY address buffer 40222 is disposed in the NERDY controller 4022, however, the NRDY address buffer 40222 may be disposed in any position in the USB host controller.

Figure 4:
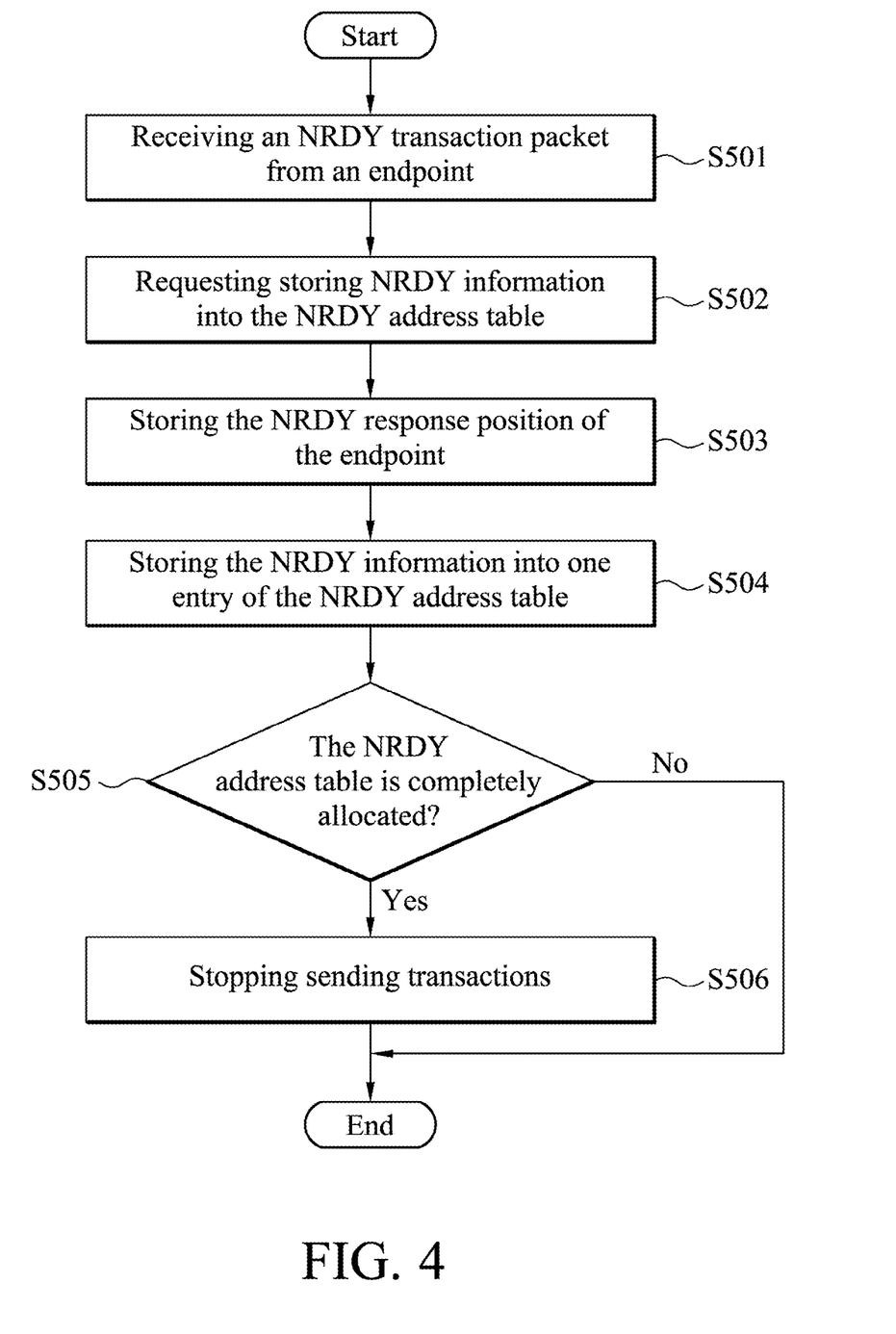
FIG. 4 is a flow chart of an exemplary embodiment of a process when an NRDY transaction packet is received.

In the following, the process when an NRDY transaction packet is received will be described with reference to FIG. 4. FIG. 4 is a flow chart of the process.

In Step S501, after the USB host controller 400 sends a request to one endpoint in the USB apparatus 200 (the endpoint 201-1), the transaction manager 401 receives an NRDY transaction packet from the endpoint 201-1. Flow then proceeds to Step S502.

In Step S502, the periodic/async controller 4021 sends a request, which indicates that NRDY information on the NRDY transaction packet from the endpoint 201-1 is to be stored into the NRDY address table, to the NERDY controller 4022. As described above, the NRDY information includes DCI, SlotID, a device address, an endpoint number, and direction. Flow then proceeds to Step S503.

In Step S503, the periodic/async controller 4021 indicates that the NRDY response position of the endpoint is to be stored or updated into the second buffer 4023. Flow then proceeds to Step S504.

In Step S504, with response to the storing request sent from the periodic/async controller 4021, the control unit 40221 in the NERDY controller 4022 stores the NRDY information on the NRDY transaction packet into one entry of the NRDY address table in the NRDY address buffer 40222. The formats of the NRDY address table and the entries of the NRDY address table are described previously in FIG. 3 and Table 1. Flow then proceeds to Step S505.

In Step S505, the control unit 40221 checks whether the NRDY address table is completely allocated. If the NRDY address table is completely allocated (no empty entry), the control unit 40221 sends a command to the transaction manager 401 to indicate that the transaction has stopped from being sent to all of the USB apparatuses communicating with the USB host controller 400 in Step S506. After receiving the command, the transaction manager 401 stops sending transactions to prevent the NRDY address table from overflowing. In this condition, the transaction manager 401 performs other transactions until one entry of the NRDY address table is released. Moreover, when the control unit 40221 determines that the NRDY address table is not completely allocated in Step S505, the transaction manager 401 continuously performs other transactions.

Step S505 and Step S506 are performed to prevent the NRDY address table from overflowing. However, if the size of the NRDY address buffer is large enough, Step S505 and Step S506 can be omitted. Moreover, Step S502 and Step S503 can be performed at the same time, or Step S503 can be performed prior to Step S502.

By storing NRDY information into the NRDY address buffer 40222 in the USB host controller, the time required for storing the NRDY information can be greatly reduced, thereby enhancing the performance of the USB host controller.

Figure 5:
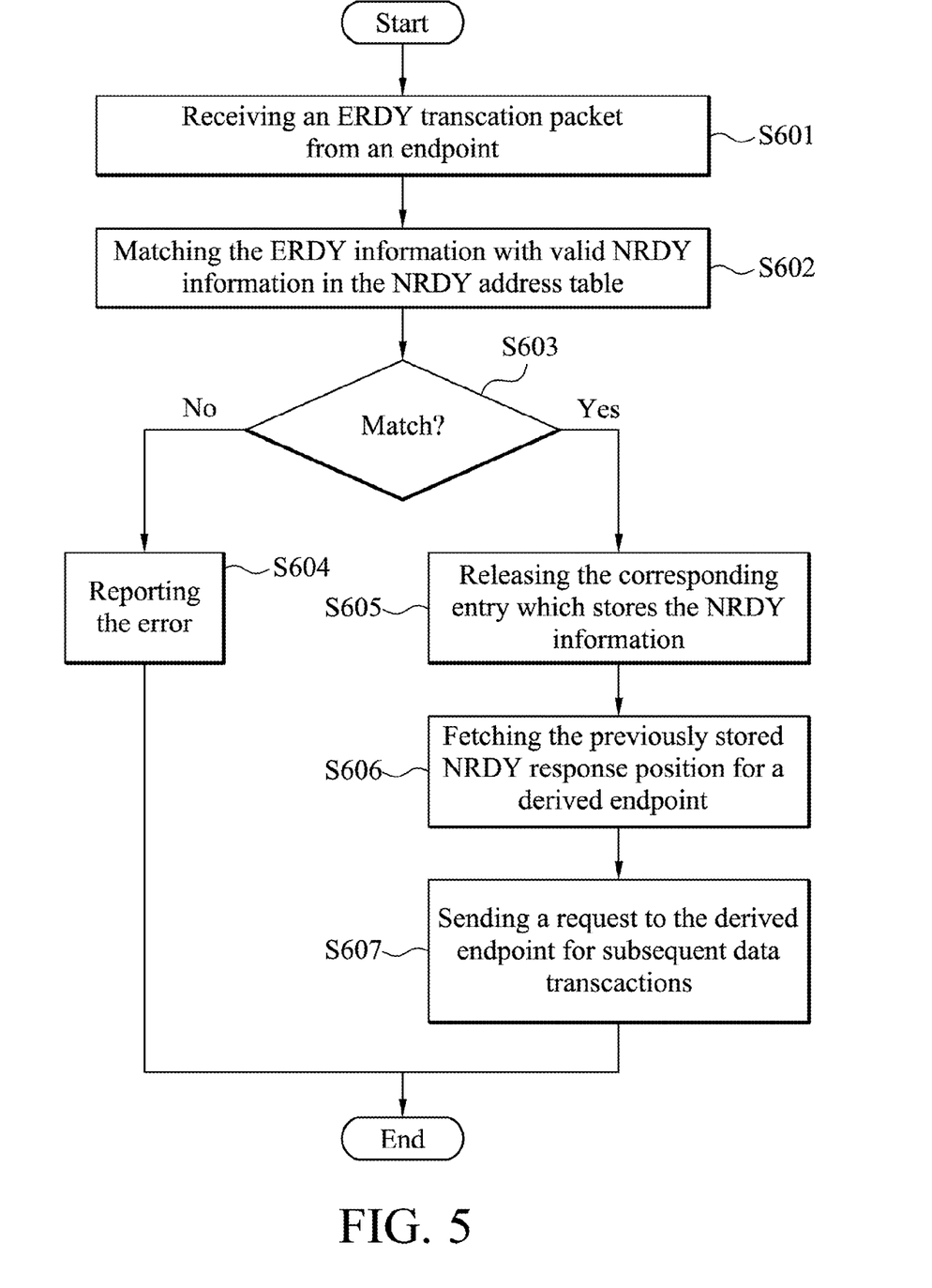
FIG. 5 is a flow chart of an exemplary embodiment of a process when an ERDY transaction packet is received.

In the following, the process when an ERDY transaction packet is received will be described with referring to FIG. 5. FIG. 5 is a flow chart of the process.

In Step S601, the transaction manager 401 receives an ERDY transaction packet from one endpoint (the endpoint 201-1) in the USB apparatus. As described above, the ERDY transaction packet includes a device address of the USB apparatus 200, an endpoint number of the endpoint 201-1, direction for indicating that the request inducing the ERDY transaction packet is an input request or an output request, and other information. Flow then proceeds to Step S602.

In Step S602, the control unit 40221 in the NERDY controller 4022 accesses the NRDY address buffer 40222 and determines whether the ERDY information on the ERDY transaction packet matches valid NRDY information in the NRDY address table. Specifically, the control unit 40221 compares the device address, endpoint number, and direction on the ERDY transaction packet with the valid NRDY information of the corresponding fields in the NRDY address table respectively. Then, in Step S603, the control unit 40221 determines whether there is NRDY information which matches with the ERDY transaction packet. Flow then proceeds to Step S603.

In Step S603, If there is no match, the determination means that the USB host controller 400 does not receives any NRDY response previously send from the endpoint 201-1 or that the USB host controller 400 does not previously send any request to the endpoint 201-1. Thus, in Step S604, the control unit 40221 reports the error to the endpoint 201-1, and then the process is completed. On the contrary, if there is a match, the control unit 40221 reads the NRDY information and releases the corresponding entry which stores the NRDY information in Step S605. In the embodiment, the control unit 40221 deletes the NRDY information stored in the matched entry. Then, in Step S606, the control unit 40221 fetches the NRDY response position which is stored previously from the second buffer 4023 according to the fields "SlotID" and "DCI" in the matched entry for a derived endpoint.

In Step S607, the transaction manager 401 sends the request to the derived endpoint for subsequent data transactions. Then, the process is completed.

During the process, requests received by the USB host controller from other endpoints are stored into the SS link Rx 4 header queue buffer 403 temporarily.

According to the embodiment, the NRDY address buffer 40222 is disposed on the inside of the USB host controller. When receiving an ERDY request, the USB host controller first accesses the NRDY address buffer in the USB host controller to look for the matched NRDY information. If there is a match, the time required for searching the matched NRDY information, and the complex process of accessing the external system memory can be eliminated, thereby accelerating the speed of responding to the ERDY request and avoiding the SS link Rx 4 header queue buffer being in a full state.

According to the embodiment, when there is a match, the response time of the USB host controller for sending request to the derived endpoint is at microsecond level which is extremely quick than that when there is a match in an external system memory (the response time is at milliseconds level).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A universal serial bus (USB) host controller which is capable of communicating with multiple USB apparatuses having endpoints and sends a request to a first endpoint, comprising:
    a first storage;
    a first control unit for storing endpoint information from the first endpoint into the first storage when the first endpoint issues an unready transaction packet in response to the request,
    a second storage; and
    a second control unit for storing position information of the first endpoint into the second storage when the first endpoint issues the unready transaction packet in response to the request,
    wherein the unready transaction packet indicates that the first endpoint is not ready.

2. The USB host controller as claimed in claim 1, wherein the first storage stores the endpoint information using a table, the first control unit checks whether the table is completely allocated after the endpoint information is stored into an entry of the table, and the first control unit stops sending transactions if the table is completely allocated.

3. The USB host controller as claimed in claim 1, wherein when the USB host controller receives a ready transaction packet from a derived endpoint, the first control unit checks whether there is matched endpoint information that matches the ready transaction packet in the first storage, and the first control unit sends a request to the derived endpoint if there is a match.

4. The USB host controller as claimed in claim 3, wherein the first control unit fetches the position information corresponding to the matched endpoint information from the second storage to obtain the derived endpoint and sends the request to the derived endpoint for subsequent data transactions.

5. A universal serial bus (USB) host controller which is capable of communicating with multiple USB apparatuses having endpoints and sends a request to a first endpoint, comprising:
    a first storage;
    a first control unit for storing endpoint information from the first endpoint into the first storage when the first endpoint issues an unready transaction packet in response to the request,
    a second storage; and
    a second control unit for storing position information of the first endpoint into the second storage when the first endpoint issues the unready transaction packet in response to the request,
    wherein when the USB host controller receives a ready transaction packet from a second endpoint, the first control unit checks whether there is endpoint information in the first storage that matches the ready transaction packet, and if there is a match, the first control unit sends a request to the second endpoint, and
    wherein the unready transaction packet indicates that the first endpoint is not ready.

6. The USB host controller as claimed in claim 5, wherein the first storage stores the endpoint information using a table, the first control unit checks whether the table is completely allocated after the endpoint information is stored into an entry of the table, and the first control unit stops sending transactions if the table is completely allocated.

7. The USB host controller as claimed in claim 5, wherein the endpoint information comprises a device context index (DCI), a slot identification (SlotID), a device address, an endpoint number, and direction.

8. The USB host controller as claimed in claim 7, wherein the first control unit checks whether there is endpoint information in the first storage that matches the ready transaction packet from the second endpoint according to the device address, the endpoint number, and the direction.

9. The USB host controller as claimed in claim 5, wherein the first control unit releases the matched endpoint information from the first storage.

10. A control method for a universal serial bus (USB) host controller, wherein the USB host controller comprises a first storage and is capable of communicating with multiple USB apparatuses having endpoints, comprising:
   sending a request to a first endpoint;
   storing the endpoint information from the first endpoint into the first storage when the first endpoint issues an unready transaction packet in response to the request, and
   storing position information of the first endpoint into a second storage when the first endpoint issues the unready transaction packet in response to the request,
   wherein the unready transaction packet indicates that the first endpoint is not ready.

11. The control method as claimed in claim 10, wherein the first storage stores the endpoint information using a table, and the control method further comprises:
   checking whether the table is completely allocated after the endpoint information is stored into an entry of the table; and
   stopping sending transactions if the table is completely allocated.

12. The control method as claimed in claim 10, further comprising:
   checking whether there is matched endpoint information in the first storage when the USB host controller receives a ready transaction packet; and
   sending a request when there is a match.

13. The control method as claimed in claim 12, further comprising:
   fetching the position information corresponding to the matched endpoint information from the second storage to obtain a derived endpoint; and
   sending the request to the derived endpoint for subsequent data transactions.

14. The control method as claimed in claim 12, further comprising:
   releasing the matched endpoint information from the first storage.

* * * * *